(12) United States Patent
Kogure

(10) Patent No.: US 9,756,214 B2
(45) Date of Patent: Sep. 5, 2017

(54) IMAGE READING APPARATUS AND METHOD FOR CONTROLLING IMAGE READING APPARATUS

(71) Applicant: CANON KABUSHIKI KAISHA, Tokyo (JP)

(72) Inventor: Takeshi Kogure, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/135,195

(22) Filed: Apr. 21, 2016

(65) Prior Publication Data

US 2016/0316103 A1   Oct. 27, 2016

(30) Foreign Application Priority Data

Apr. 24, 2015   (JP) .................. 2015-088854

(51) Int. Cl.
*H04N 1/327*   (2006.01)
*H04N 1/00*   (2006.01)

(52) U.S. Cl.
CPC ..... *H04N 1/32771* (2013.01); *H04N 1/00037* (2013.01); *H04N 1/00079* (2013.01); *H04N 1/00588* (2013.01); *H04N 1/00814* (2013.01); *H04N 1/00824* (2013.01); *H04N 1/00896* (2013.01); *H04N 1/327* (2013.01); *H04N 2201/0094* (2013.01)

(58) Field of Classification Search
USPC .............................. 358/1.15–1.13
See application file for complete search history.

(56) References Cited

U.S. PATENT DOCUMENTS

| | | |
|---|---|---|
| 2010/0250978 A1 | 9/2010 | Nakamura |
| 2011/0228305 A1 | 9/2011 | Sasase |
| 2013/0163056 A1* | 6/2013 | Hanayama ......... H04N 1/00013 358/474 |
| 2014/0204407 A1 | 7/2014 | Tokumaru |

FOREIGN PATENT DOCUMENTS

| | | |
|---|---|---|
| GB | 2491265 A | 11/2012 |
| JP | 2014-230070 A | 12/2014 |

* cited by examiner

*Primary Examiner* — Saeid Ebrahimi Dehkord
(74) *Attorney, Agent, or Firm* — Canon USA, Inc. IP Division

(57) ABSTRACT

The image reading apparatus including a reading unit configured read an image of a document according to a read request transmitted from an external device, includes a detection unit configured to detect a state of the document to be read by the reading unit, a reception unit configured to receive a request from the external device to obtain a state of the image reading apparatus, a power supply unit configured to, in a power saving state where power supply to the reading unit and the detection unit is stopped, supply power to the detection unit based on the reception of the request, and a transmission unit configured to transmit the state of the document to be read by the reading unit detected by the detection unit to which the power is supplied by the power supply unit, to the external device as a response to the request.

15 Claims, 14 Drawing Sheets

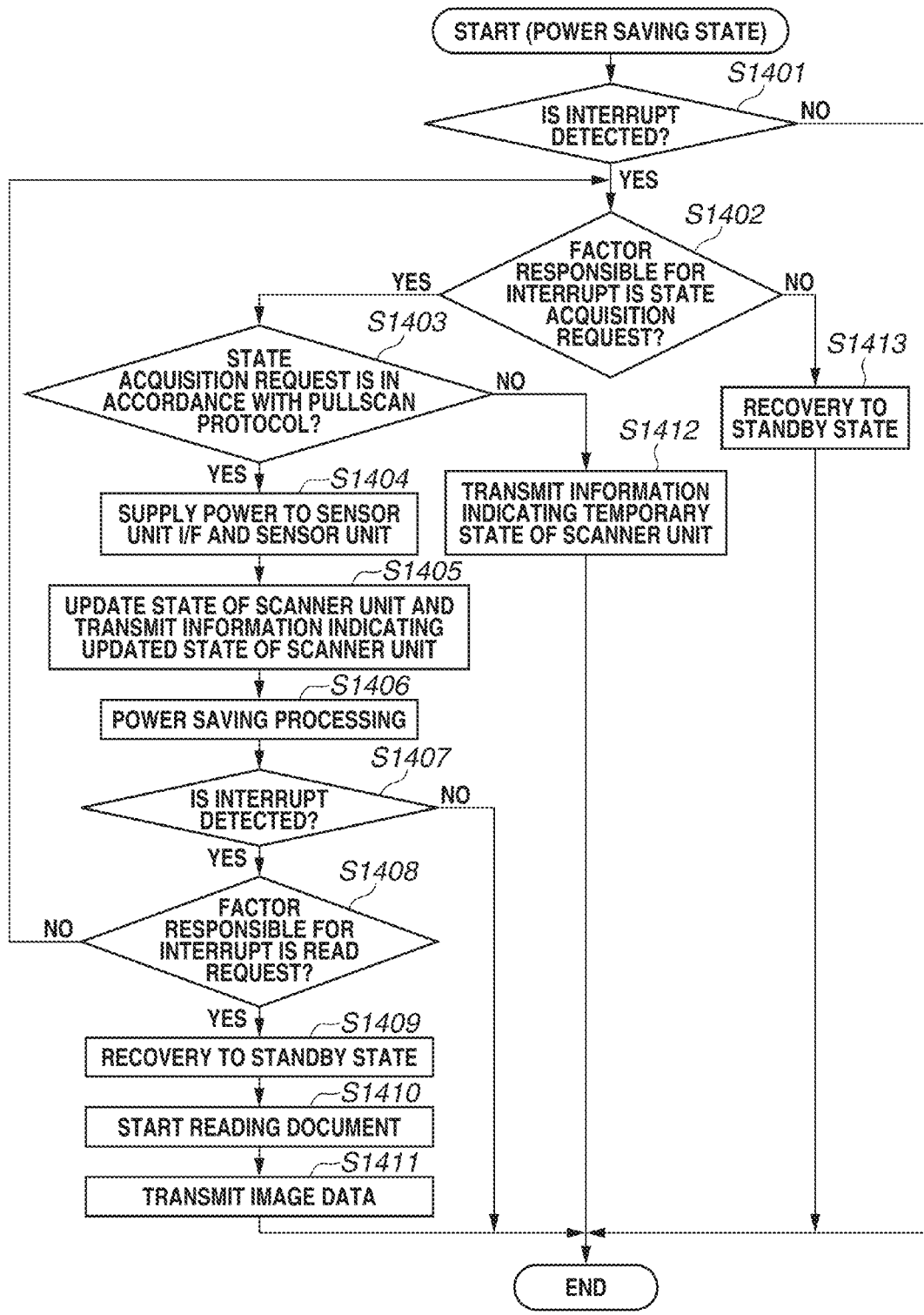

IMAGE READING APPARATUS AND METHOD FOR CONTROLLING IMAGE READING APPARATUS

BACKGROUND OF THE INVENTION

Field of the Invention

The present invention relates to an image reading apparatus which reads an image of a document according to a read request from an external device.

Description of the Related Art

An image reading apparatus has been known which reads an image of a document according to a read request from an external device, generates image data corresponding to the image, and transmits the image data to the external device. A function by which the image reading apparatus reads an image of a document according to a read request from an external device will hereinafter be referred to as a pullscan function.

Conventionally, if the image reading apparatus executes a pullscan function, the user needs to manually set the image reading apparatus to a pullscan mode. It has been necessary that the user manually sets the pullscan mode each time the pullscan function is executed. Hence, an image reading apparatus that automatically enters a pullscan mode and can read an image of a document according to a read request from an external apparatus has been discussed.

Recent image reading apparatuses typically enters a power saving state to reduce power consumption during standby time. A conventional image reading apparatus which is manually set to the pullscan mode does not enter the power saving state if the image reading apparatus is set to the pullscan mode by the user. Thus, there has not been a need to take account of receiving the read request from the external device in the power saving state.

An image reading apparatus that automatically enters the pullscan mode according to a read request from an external device may receive a read request when in the power saving state. In such a case, the image reading apparatus needs to automatically recover from the power saving state. According to Japanese Patent Application Laid-Open No. 2014-230070, if an image reading apparatus receives a read request in a power saving state from an external device, the image reading apparatus recovers from the power saving state and becomes able to read a document.

The image reading apparatus discussed in Japanese Patent Application Laid-Open No. 2014-230070 recovers from the power saving state if a read request for an image of a document is received. Therefore, the external device cannot figure out a state of the document to be read before transmitting the read request. The image reading apparatus discussed in Japanese Patent Application Laid-Open No. 2014-230070 can thus recover from the power saving state and start a read operation according to the read request although there is no document placed on an automatic document conveyance apparatus (hereinafter, referred to as an automatic document feeder (ADF)) which conveys a plurality of sheets to a reading unit one by one.

SUMMARY OF THE INVENTION

The present invention is directed to providing an image reading apparatus which can supply power to a detection unit configured to detect a state of a document based on a state acquisition request received from an external device.

According to an aspect of the present invention, an image reading apparatus including a reading unit configured to read an image of a document, the image reading apparatus reading an image of a document according to a read request transmitted from an external device, includes a detection unit configured to detect a state of the document to be read by the reading unit, a reception unit configured to receive a state acquisition request from the external device, the state acquisition request being intended to obtain a state of the image reading apparatus, a power supply unit configured to, in a power saving state where power supply to the reading unit and the detection unit is stopped, supply power to the detection unit based on the reception of the state acquisition request made by the reception unit, and a transmission unit configured to transmit the state of the document to be read by the reading unit, detected by the detection unit to which the power is supplied by the power supply unit, to the external device as a response to the state acquisition request.

Further features of the present invention will become apparent from the following description of embodiments with reference to the attached drawings.

BRIEF DESCRIPTION OF THE DRAWINGS

FIG. 14 is a flowchart illustrating an operation of the MFP.

DESCRIPTION OF THE EMBODIMENTS

Embodiments of the present invention will be described below with reference to the drawings.

Figure 1:
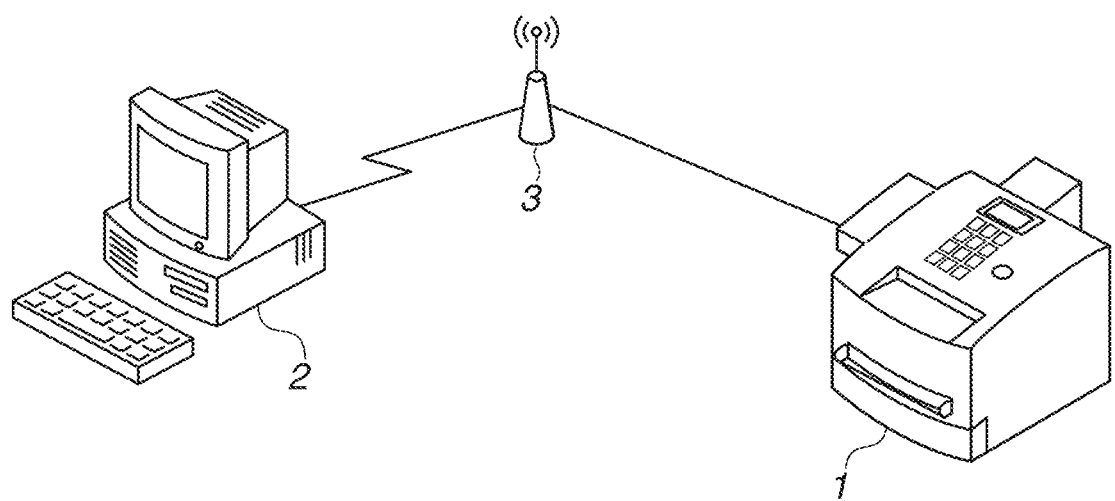
FIG. 1 is an overall view of a system including a multifunction peripheral (MFP).

A first embodiment will be described below. FIG. 1 is an overall view of a system.

The system of FIG. 1 includes a multifunction peripheral (MFP) 1, an information processing apparatus 2, and a wireless network router 3. The MFP 1 (image reading apparatus) includes a print function, a scan function, and a facsimile function. The MFP 1 receives a read request transmitted from the information processing apparatus 2 via the wireless network router 3, and reads an image of a document according to the read request. The MFP 1 then transmits digital image data of the read image to the information processing apparatus 2 via the wireless network router 3.

The information processing apparatus (external device) 2 is communicably connected with the MFP 1 via the wireless network router 3. The information processing apparatus 2 and the wireless network router 3 are connected by a wireless local area network (LAN). The MFP 1 and the wireless network router 3 are connected by a wired LAN. The information processing apparatus 2 and the wireless network router 3 may be connected by a wired LAN. Alternatively, the MFP 1 and the wireless network router 3 may be connected by a wireless LAN. Further, the information processing apparatus 2 and the MFP 1 may be directly connected by a network cable.

Figure 2:
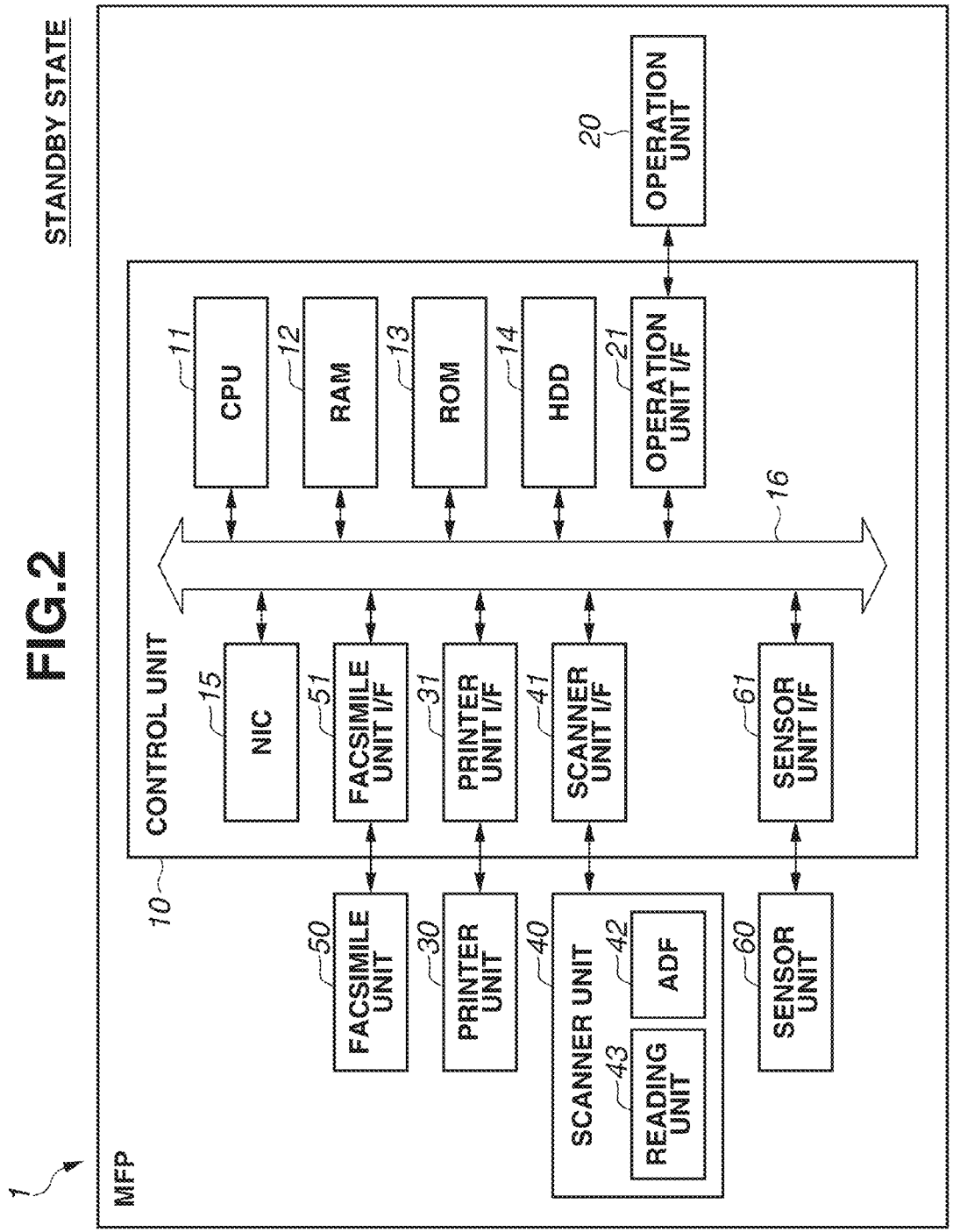
FIG. 2 is a block diagram of the MFP.

FIG. 2 is a block diagram of the MFP 1.

As illustrated in FIG. 2, the MFP 1 includes a control unit 10, an operation unit 20, a printer unit 30, a scanner unit 40, a facsimile unit 50, and a sensor unit 60.

The control unit 10 controls the operation unit 20, the printer unit 30, the scanner unit 40, and the facsimile unit 50 which are connected to the control unit 10.

The operation unit 20 includes various buttons and a display unit to be operated by a user. The display unit is a liquid crystal display including a touch panel function, and accepts touch operations from the user.

The printer unit 30 outputs a digital image to a sheet.

The scanner unit 40 optically reads an image from a document and generates digital image data.

The facsimile unit 50 is connected to a public switched telephone network (PSTN) line. The facsimile unit 50 transmits and receives facsimile data to/from a not-illustrated facsimile apparatus.

The sensor unit 60 detects whether a document is placed on an ADF of the scanner unit 40.

Next, details of the control unit 10 will be described.

The control unit 10 includes a central processing unit (CPU) 11, a random access memory (RAM) 12, a read-only memory (ROM) 13, and a hard disk drive (HDD) 14. The control unit 10 also includes a network interface (hereinafter, referred to as a network interface card (NIC)) 15, and an operation unit interface (operation unit I/F) 21. The control unit 10 also includes a printer unit interface (hereinafter, referred to as a printer unit I/F) 31, and a scanner unit interface (hereinafter, referred to as a scanner unit I/F) 41. The control unit 10 also includes a facsimile unit interface (hereinafter, referred to as a facsimile unit I/F) 51. The control unit 10 also includes a sensor unit interface (hereinafter, referred to as a sensor unit I/F) 61.

The CPU 11 performs various types of data processing based on a program or programs. The CPU 11 controls the devices connected to a system bus 16 in a centralized manner. The RAM 12 is a main storage unit for CPU 11 operation. Examples of the RAM 12 include a dynamic random access memory (DRAM). The ROM 13 stores a boot program of the system. The HDD 14 is a secondary storage unit. The HDD 14 stores an operating system and a print job received via the NIC 15.

The NIC 15 is an interface for communicating with an external device via a LAN. The printer unit I/F 31 is an interface for communicating with the printer unit 30. Data of an image to be printed by the printer unit 30 is transmitted from the control unit 10 via the printer unit I/F 31. The scanner unit I/F 41 is an interface for communicating with the scanner unit 40. Image data (binary data) of an image read by the scanner unit 40 is transmitted to the control unit 10 via the scanner unit I/F 41. The operation unit I/F 21 is an interface for communicating with the operation unit 20.

The sensor unit I/F 61 is an interface for communicating with the sensor unit 60. If a document is placed on the ADF, the sensor unit I/F 61 receives information indicating that a document is placed on the ADF from the sensor unit 60.

The scanner unit 40 includes an ADF 42 and a reading unit 43 which reads an image of a document.

Figure 3:
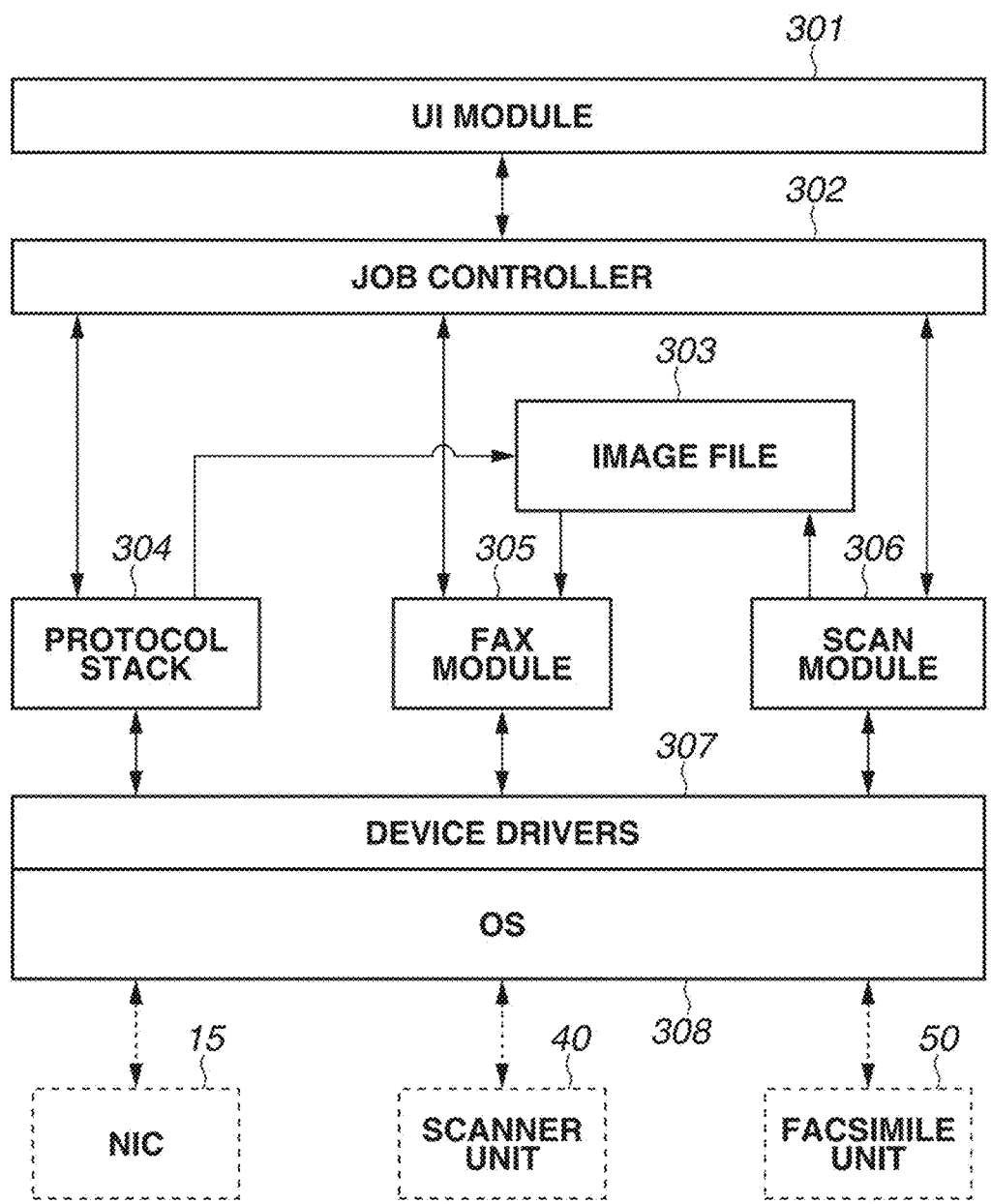
FIG. 3 is a software block diagram of the MFP.

FIG. 3 is a software block diagram of the MFP 1.

The units illustrated in solid lines in FIG. 3 are software modules that are operated by the CPU 11 reading and executing a program or programs stored in the ROM 13 or the HDD 14.

A user interface (UI) module 301 provides various types of information to the user via the operation unit 20, and accepts various instructions from the user. A job controller 302 accepts jobs such as copy, print, and facsimile, and controls execution of the accepted jobs. A protocol stack 304 holds various network protocols such as the Transfer Control Protocol/Internet Protocol (TCP/IP) and the Hypertext Transfer Protocol (HTTP).

In the present embodiment, data transmitted from the information processing apparatus 2 is received via the network interface controller (NIC) 15 according to a network protocol held in the protocol stack 304. Received image data is stored by an image file 303. The image file 303 is a software module that manages image data stored in the RAM 12 and the HDD 14.

The image file 303 manages not only the image data received via the NIC 15 but also image data generated by the scanner unit 40. The generation of the image data by the scanner unit 40 is controlled by a scan module 306. A facsimile (FAX) module 305 controls facsimile communication carried out by the facsimile unit 50. When the MFP 1 performs facsimile transmission, the FAX module 305 reads and transmits image data managed by the image file 303.

An operating system (OS) 308 adjusts modules and tasks, and manages the entire software of the MFP 1. The OS 308 controls device drivers 307. The device drivers 307 control hardware devices such as the scanner unit 40 and the facsimile unit 50.

Figure 4:
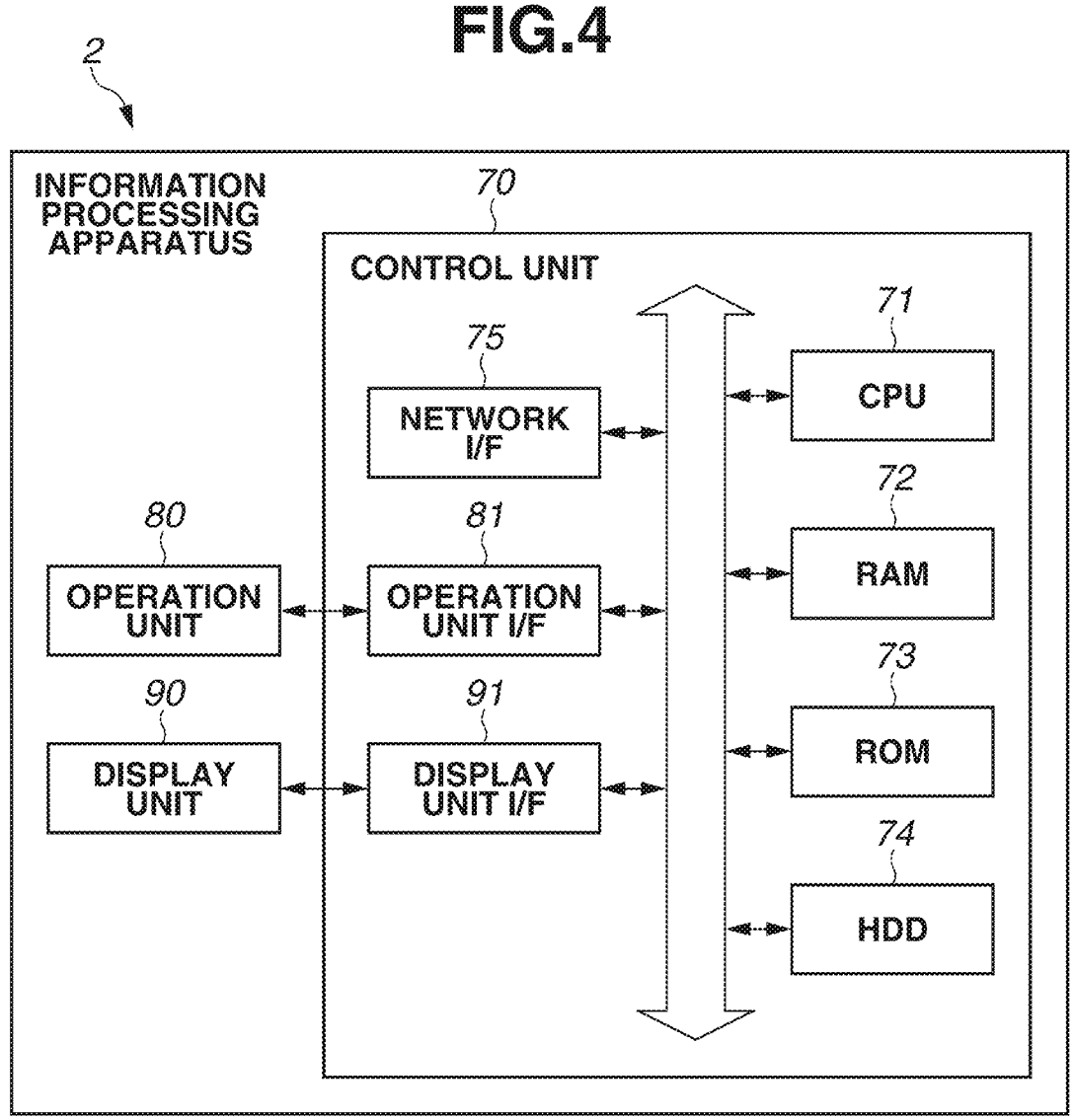
FIG. 4 is a block diagram of an information processing apparatus.

FIG. 4 is a block diagram of the information processing apparatus 2.

As illustrated in FIG. 4, the information processing apparatus 2 includes a control unit 70 which controls the information processing apparatus 2, an operation unit 80 such as a keyboard and a mouse, and a display unit 90 which displays an image. The control unit 70 includes a CPU 71, a RAM 72, a ROM 73, an HDD 74, a network I/F 75, an operation unit I/F 81, and a display unit I/F 91.

In the present embodiment, a scan application for causing the MFP 1 to execute a pullscan function is stored in the HDD 74.

Figure 5:
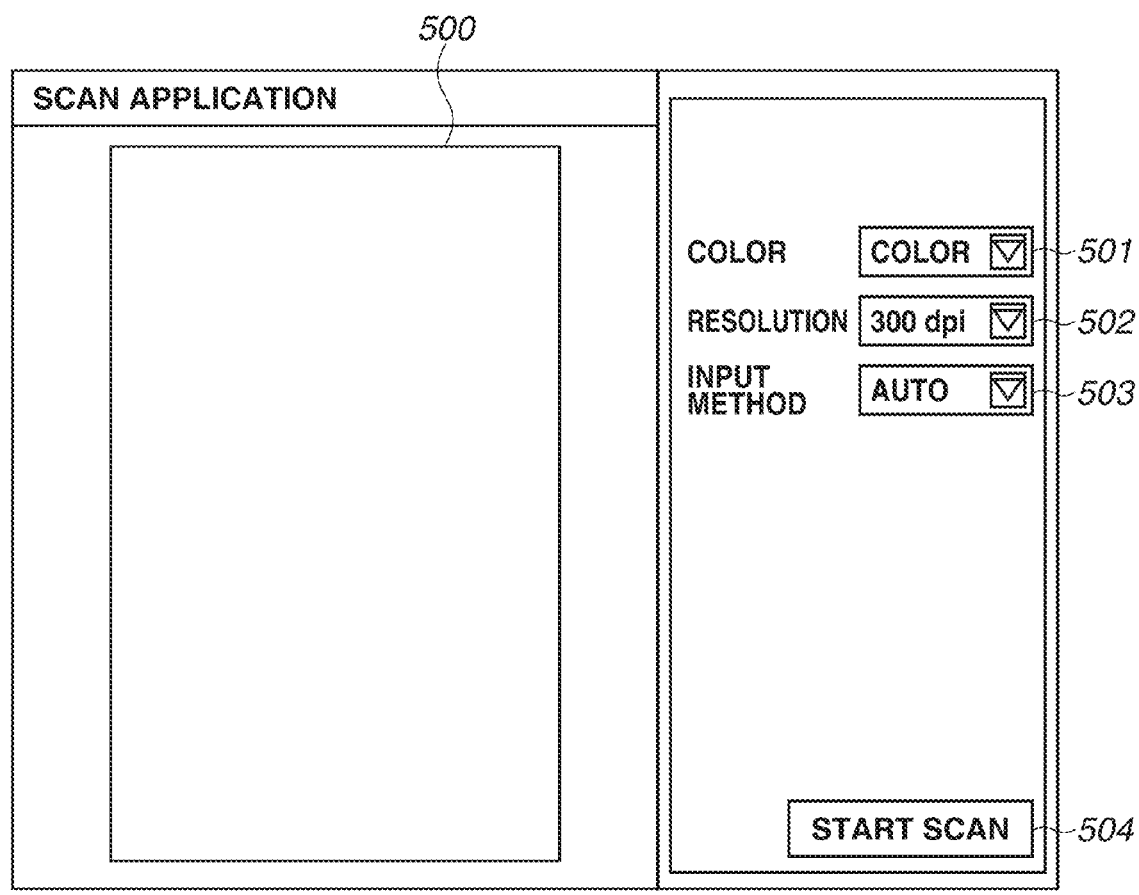
FIG. 5 is a diagram illustrating a screen of a scan application.

The scan application, if executed by the CPU 71, displays the screen of FIG. 5 on the display unit 90.

The screen of FIG. 5 includes a read image display area 500 for displaying an image read by the scanner unit 40. The screen includes a color mode specification section 501 for specifying a color mode in which to read a document, a resolution specification section 502 for specifying resolution in which to read the document, and an input method specification section 503 for specifying an input method of the document.

The user selects a monochrome mode or a color mode from a list in the color mode specification section 501. If the user selects the monochrome mode, the scanner unit 40 generates digital monochrome image data. If the user selects the color mode, the scanner unit 40 generates digital color image data.

The user selects resolution in which the scanner unit 40 reads an image, from a list in the resolution specification section 502. The scanner unit 40 reads a document in the resolution specified by the user.

The user selects any one of auto, a pressing plate, and an ADF from a list in the input method specification section 503. If the user selects the pressing plate, the scanner unit 40 reads an image of a document placed on a glass plate. If the user selects the ADF, the scanner unit 40 reads an image of a document placed on the ADF 42. If the user selects auto and a document is placed on the ADF 42, the scanner unit 40 reads the document placed on the ADF 42. If no document is placed on the ADF 42, the scanner unit 40 reads a document placed on the glass plate.

The MFP 1 does not include a unit that detects whether a document is placed on the glass plate. Accordingly, if the user selects the pressing plate or if the user selects auto and no document is placed on the ADF 42, the scanner unit 40 performs reading even when no document is placed on the glass plate.

The screen of FIG. 5 includes a read start button 504 for making the scanner unit 40 start reading a document.

<Pullscan Sequence>

Figure 6:
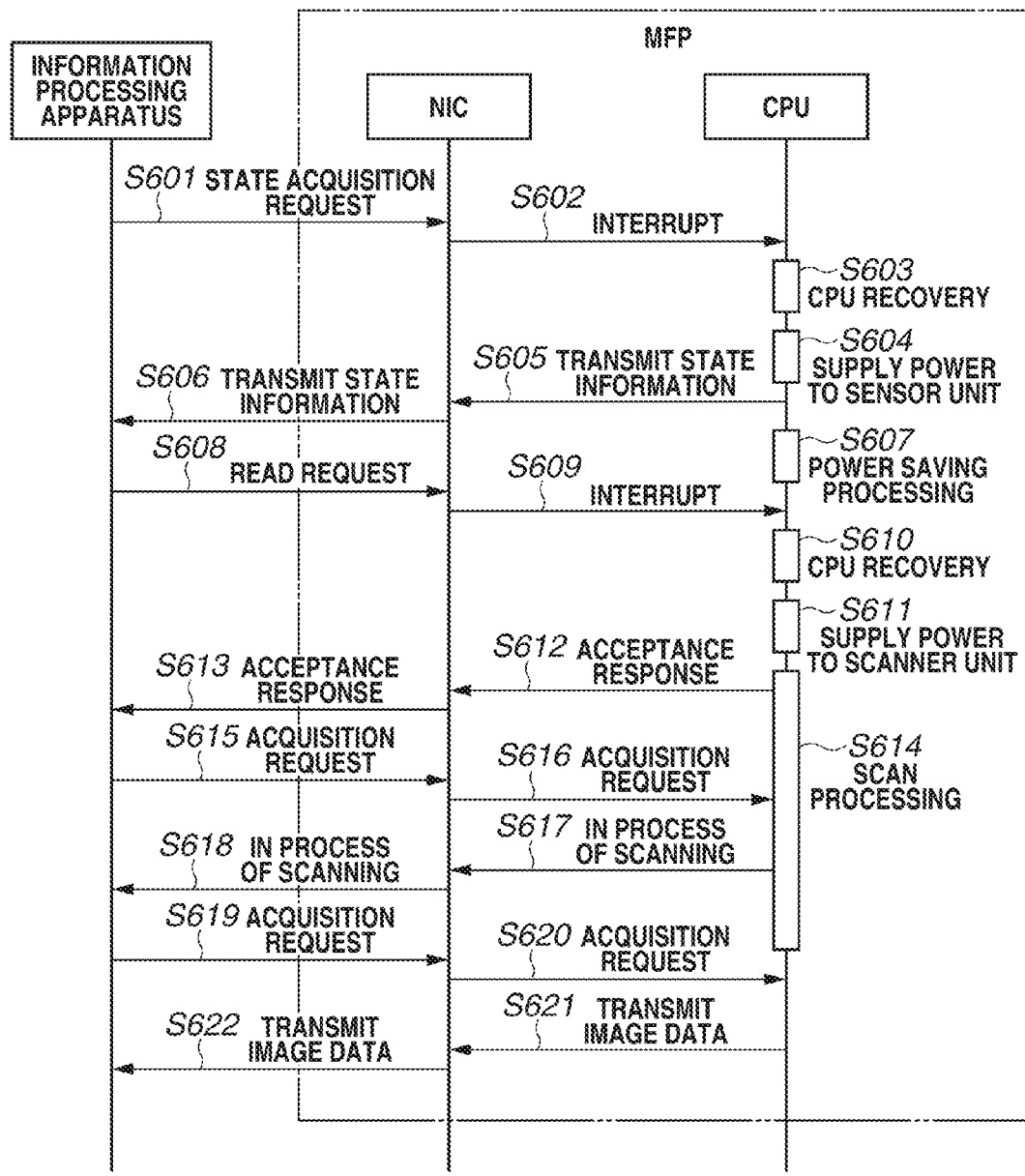
FIG. 6 is a sequence diagram when a pullscan function is executed.

FIG. 6 is a sequence diagram when the pullscan function is executed.

Initially, the user operates the operation unit 80 of the information processing apparatus 2 to give an instruction to execute the scan application. According to the instruction from the user, the CPU 71 executes the scan application. As a result, the screen of FIG. 5 is displayed on the display unit 90.

The user then operates the operation unit 80 to select a color mode, resolution, and an input method on the screen of FIG. 5, and selects the read start button 504. In step S601, according to the selection of the read start button 504 by the user, the information processing apparatus 2 transmits a request to obtain a state of the scanner unit 40 (hereinafter, referred to as a state acquisition request) to the MFP 1.

Figure 8:
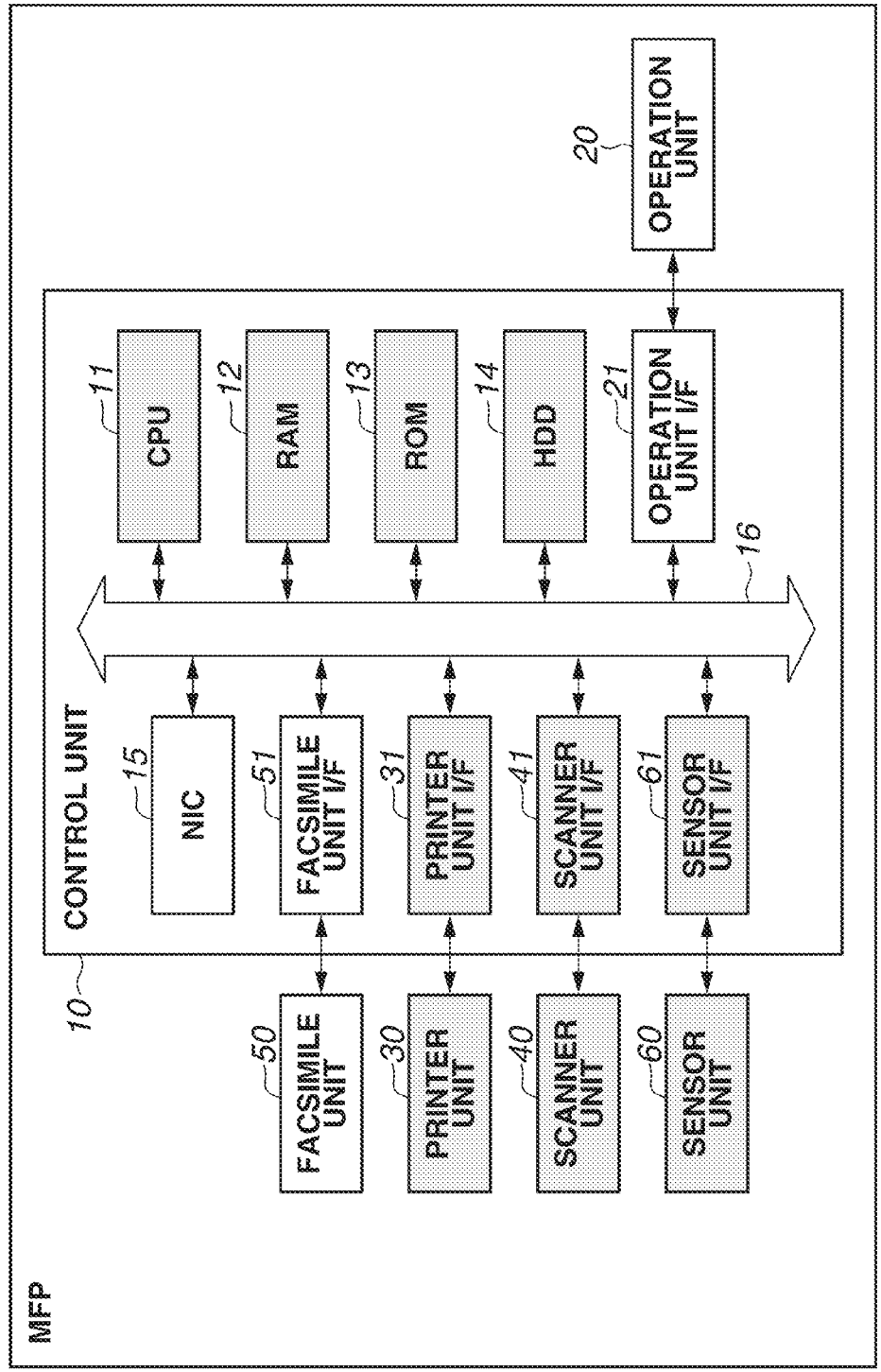
FIG. 8 is a diagram illustrating the MFP in a power saving state.
Figure 9:
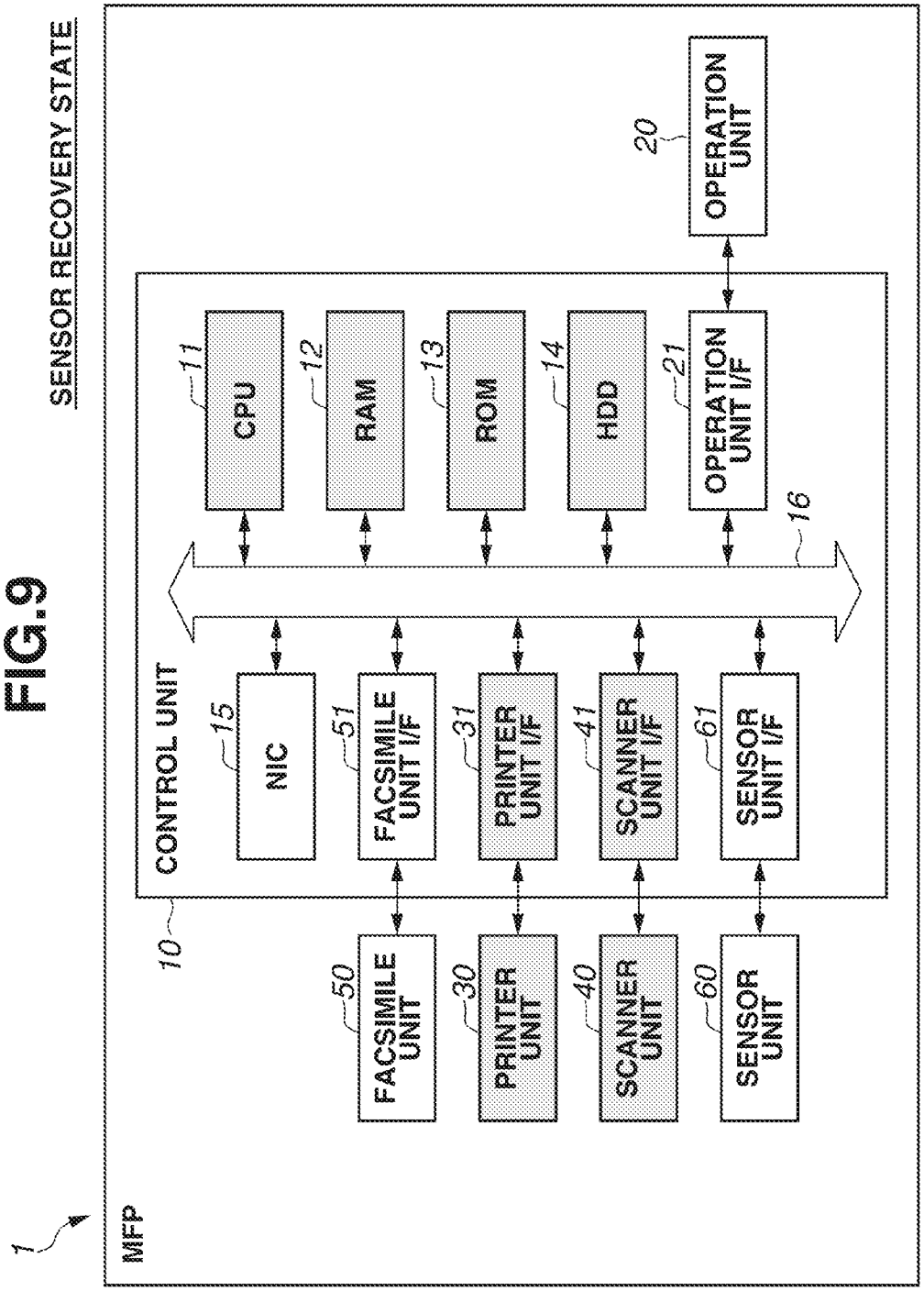
FIG. 9 is a diagram illustrating the MFP in a sensor recovery state.

If the NIC 15 receives the state acquisition request when the MFP 1 is in a power saving state (see FIG. 8), then in step S602, the NIC 15 issues an interrupt to the CPU 11. In step S603, the CPU 11 receiving the interrupt recovers from the power conserving state. In step S604, the CPU 11 having recovered from the power conserving state performs control such that power is supplied to the sensor unit 60. As a result, the MFP 1 enters a sensor recovery state illustrated in FIG. 9. In the foregoing power saving state, as illustrated in FIG. 8, power is supplied to the operation unit 20, the facsimile unit 50, the operation unit I/F 21, the NIC 15, and the facsimile unit I/F 51. Power supply to the other portions is stopped. In the sensor recovery state, power is supplied to the operation unit 20, the facsimile unit 50, the operation unit I/F 21, the NIC 15, the facsimile unit I/F 51, the sensor unit 60, and the sensor unit I/F 61. The power supply to the other portions is stopped.

The CPU 11 obtains information indicating whether a document is placed on the ADF 42, from the sensor unit 60 to which the power is supplied. In steps S605 and S606, the CPU 11 transmits the information indicating the state of the scanner unit 40 (hereinafter, referred to as state information) to the information processing apparatus 2 via the NIC 15.

Now, details of the information (state information) indicating the state of the scanner unit 40 will be described.

Figure 7:
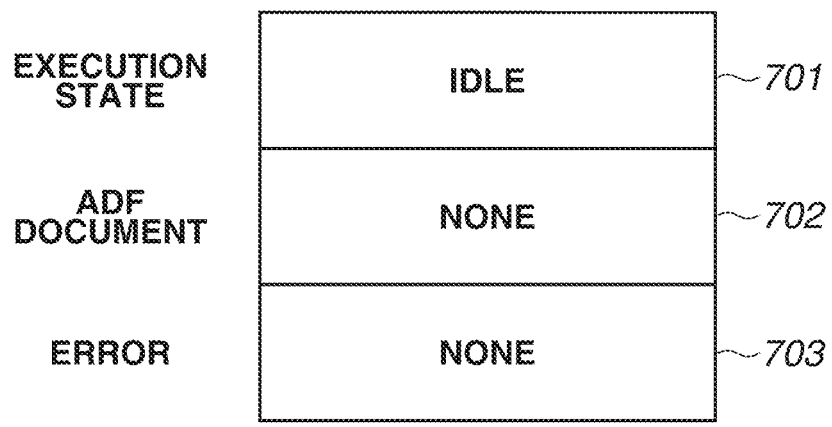
FIG. 7 is a diagram illustrating state information about a scanner unit.

FIG. 7 illustrates the information indicating the state of the scanner unit 40. The information (state information) indicating the state of the scanner unit 40 includes information 701 indicating an execution state of the scanner unit 40, information 702 indicating whether a document is placed on the ADF 42, and information 703 indicating an error.

Examples of the information 701 indicating the execution state of the scanner unit 40 include information indicating an idle state and information indicating that the scanner unit 40 is in the process of scanning. Examples of the information indicating an error include information indicating paper jam and information indicating the absence of an error.

In step S607, the CPU 11 having transmitted the information indicating the state of the scanner unit 40 to the information processing apparatus 2 shifts the MFP 1 to the power saving state when the processing corresponding to the state acquisition request ends.

In step S608, the CPU 71 of the information processing apparatus 2 controls transmission of the read request based on the received information indicating the state of the scanner unit 40. Details of the transmission control of the read request by the CPU 71 will be described below.

If the NIC 15 receives the read request in the power saving state, then in step S609, the NIC 15 issues an interrupt to the CPU 11. In step S610, the CPU 11 having received the interrupt recovers from the power saving state. In step S611, the CPU 11 performs control such that power is supplied to the scanner unit 40. As a result, the MFP 1 enters a standby state illustrated in FIG. 2. In the standby state, power is supplied to each unit of the MFP 1. In the example described above, the MFP 1 enters the standby state if the read request is received. However, the power supply to the printer unit 30 and the printer unit I/F 31 may remain stopped.

If the read request is received, then in steps S612 and S613, the CPU 11 transmits a scan start acceptance response (hereinafter, referred to as an acceptance response) to the information processing apparatus 2. In step S614, the CPU 11 instructs the scanner unit 40 to read an image of a document in response to the reception of the read request. The scanner unit 40 having received the instruction starts to read an image of a document.

In steps S615 and S616, to obtain image data of the image read by the scanner unit 40, the information processing apparatus 2 having received the acceptance response transmits an acquisition request for the image data to the MFP 1. If the scanner unit 40 is in the process of scanning, then in steps S617 and S618, the CPU 11 having received the acquisition request for the image data transmits status information indicating that the scanner unit 40 is in the process of scanning to the information processing apparatus 2. If the scanner unit 40 is in the process of scanning, then in steps S619 and S620, the information processing apparatus 2 transmits the acquisition request for the image data again after a lapse of a predetermined time. If the reading of the document is completed, then in steps S621 and S622, the CPU 11 having received the acquisition request for the image data transmits the obtained image data to the information processing apparatus 2.

<Description of Operation of Information Processing Apparatus 2>

Figure 10:
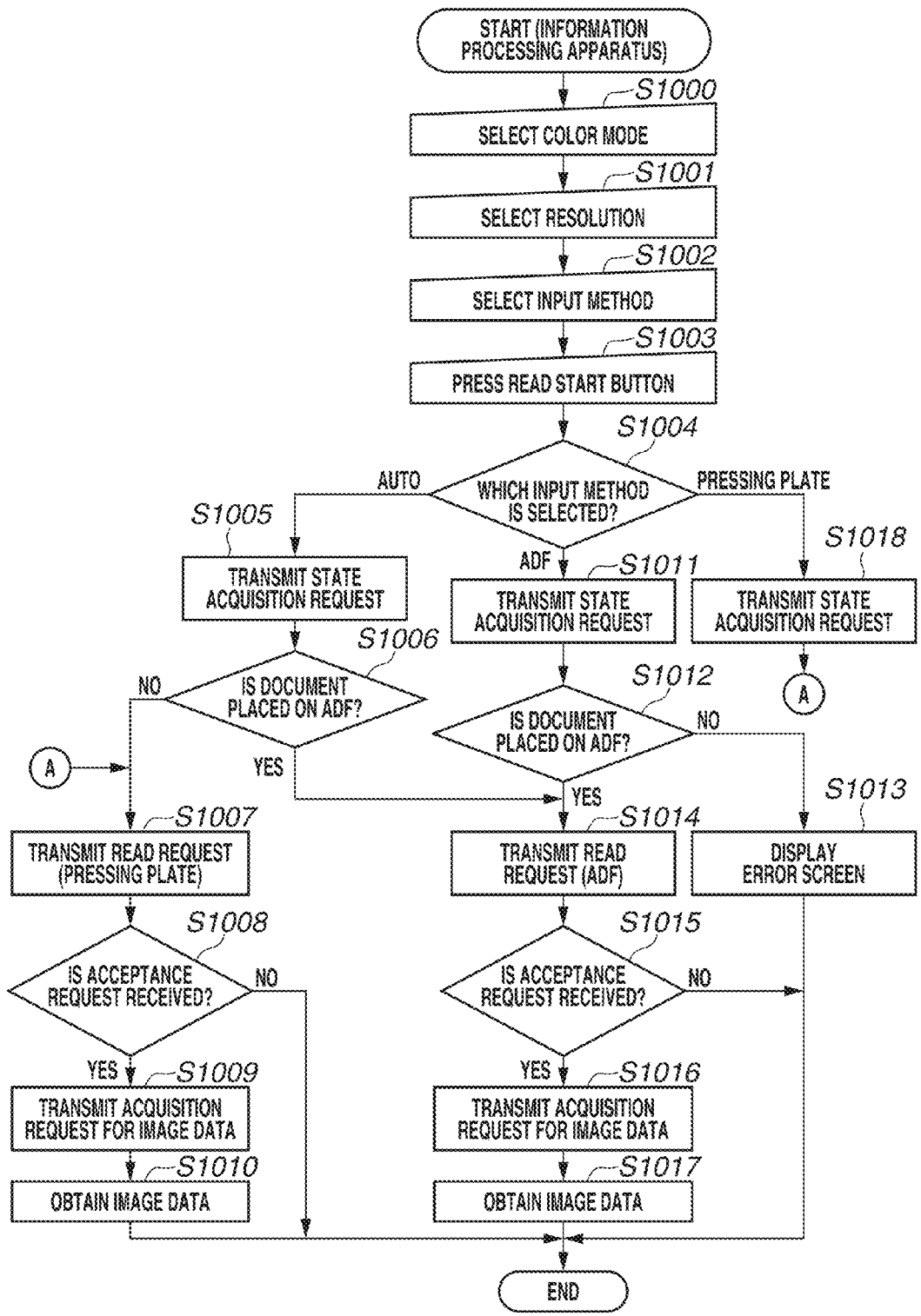
FIG. 10 is a flowchart illustrating an operation of the information processing apparatus.

FIG. 10 is a flowchart illustrating an operation of the information processing apparatus 2 when the scan application is executed.

Initially, the user operates the operation unit 20 to activate the scan application. In steps S1000, S1001, and S1002, the user having activated the scan application selects a color mode, resolution, and an input method. In step S1003, the user presses the read start button 504. If the read start button 405 is pressed, then in step S1004, the CPU 71 of the information processing apparatus 2 determines which input method is selected in step S1002.

If auto is selected as the input method (AUTO in step S1004), then in step S1005, the CPU 71 transmits a state acquisition request. In step S1006, the CPU 71 determines whether a document is placed on the ADF 42, based on state information obtained as a response to the state acquisition request. The following description will be given on the assumption that the executing state of the scanner unit 40 is an idle state and the information about an error indicates the absence of an error.

Figure 11:
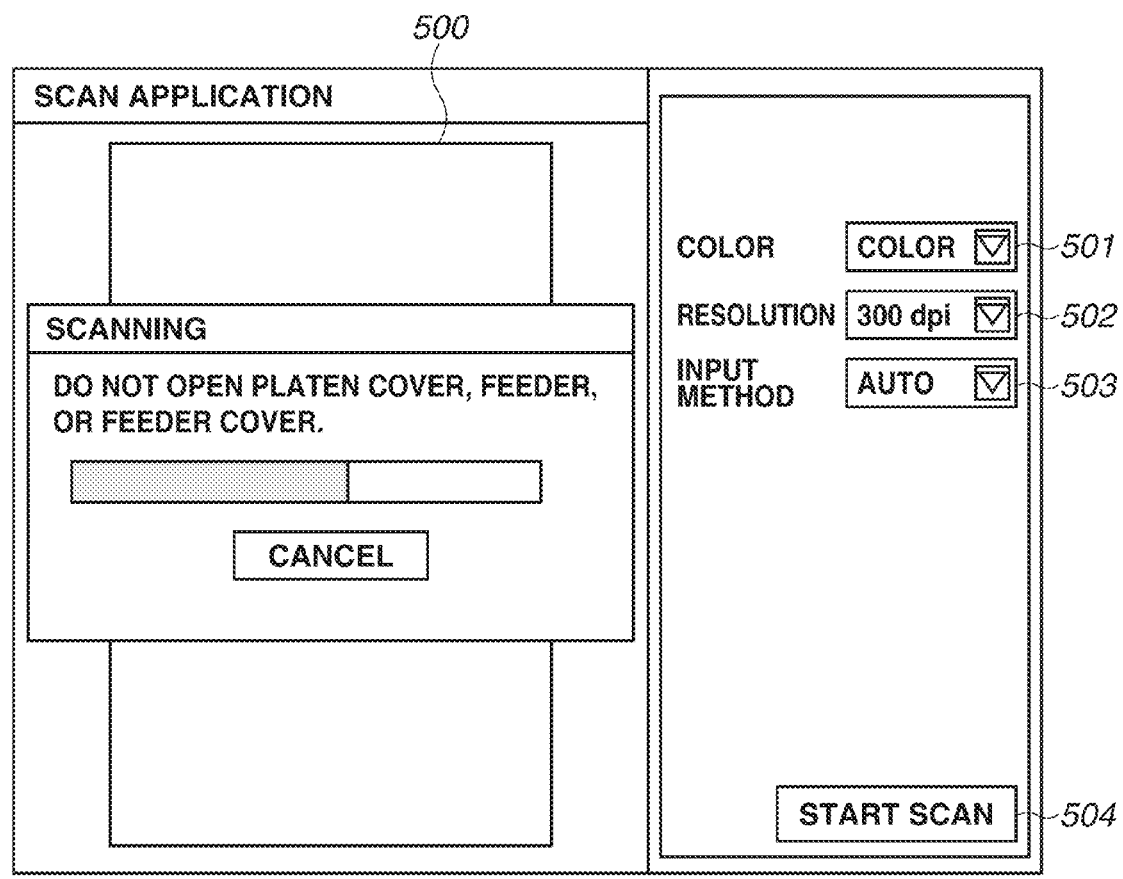
FIG. 11 is a diagram illustrating a screen of the scan application during execution of a scan.

If the CPU 71 determines that no document is placed on the ADF 42 (NO in step S1006), then in step S1007, the CPU 71 transmits a read request (pressing plate) so that an image of a document placed on the glass plate is read. In step S1008, the CPU 71 determines whether an acceptance response is received from the MFP 1. If the CPU 71 determines that an acceptance response is received (YES in step S1008), then in step S1009, the CPU 71 transmits an acquisition request to obtain image data read by the scanner unit 40. If the scanner unit 40 is in the process of reading an image, the CPU 71 displays information indicating that a scan is in process on the display unit 90 as illustrated in FIG. 11.

Figure 12:
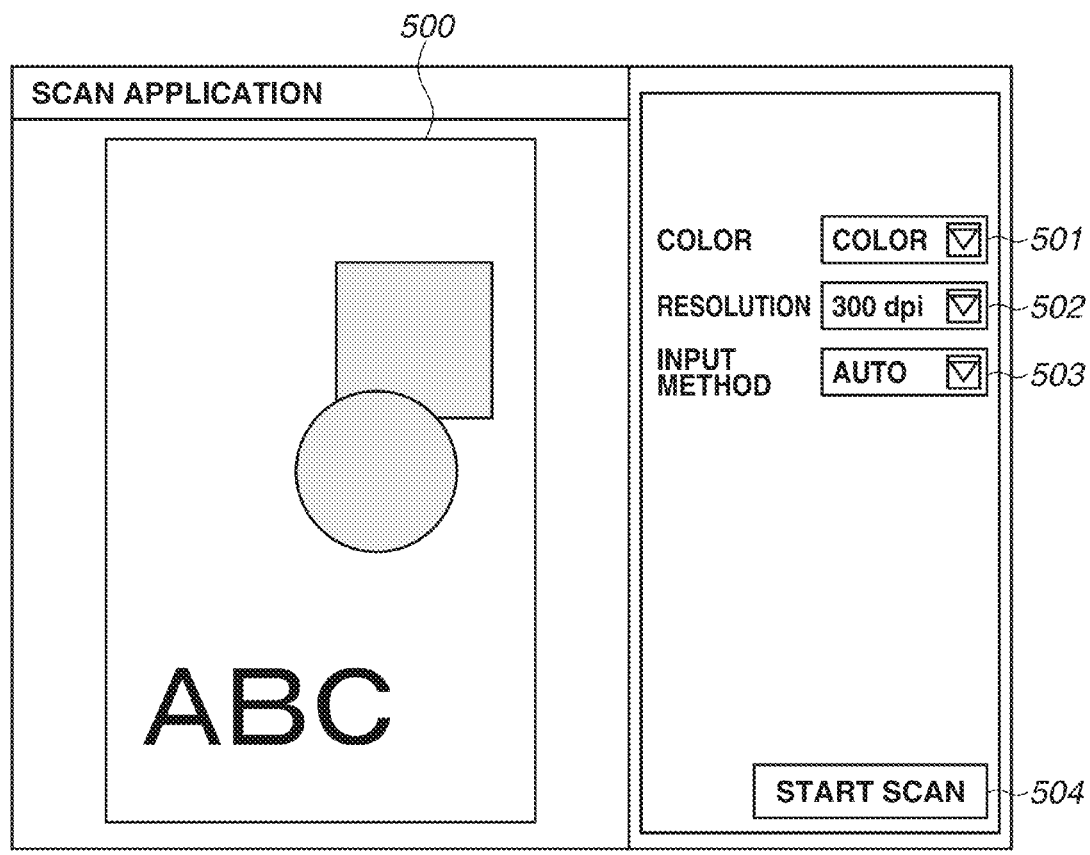
FIG. 12 is a diagram illustrating a screen displaying image data of the scan application.

In step S1010, the CPU 71 obtains the image data from the MFP 1 as a response to the acquisition request. The obtained image data is displayed on the display unit 90 as illustrated in FIG. 12.

In step S1006, if the CPU 71 determines that a document is placed on the ADF 42 (YES in step S1006), the processing proceeds to steps S1014 to S1017. The processing of steps S1014 to S1017 will be described below.

If the ADF 42 is selected as the input method (ADF in step S1004), then in step S1011, the CPU 71 transmits a state acquisition request. In step S1012, the CPU 71 determines whether a document is placed on the ADF 42, based on state information obtained as a response to the state acquisition request.

Figure 13:
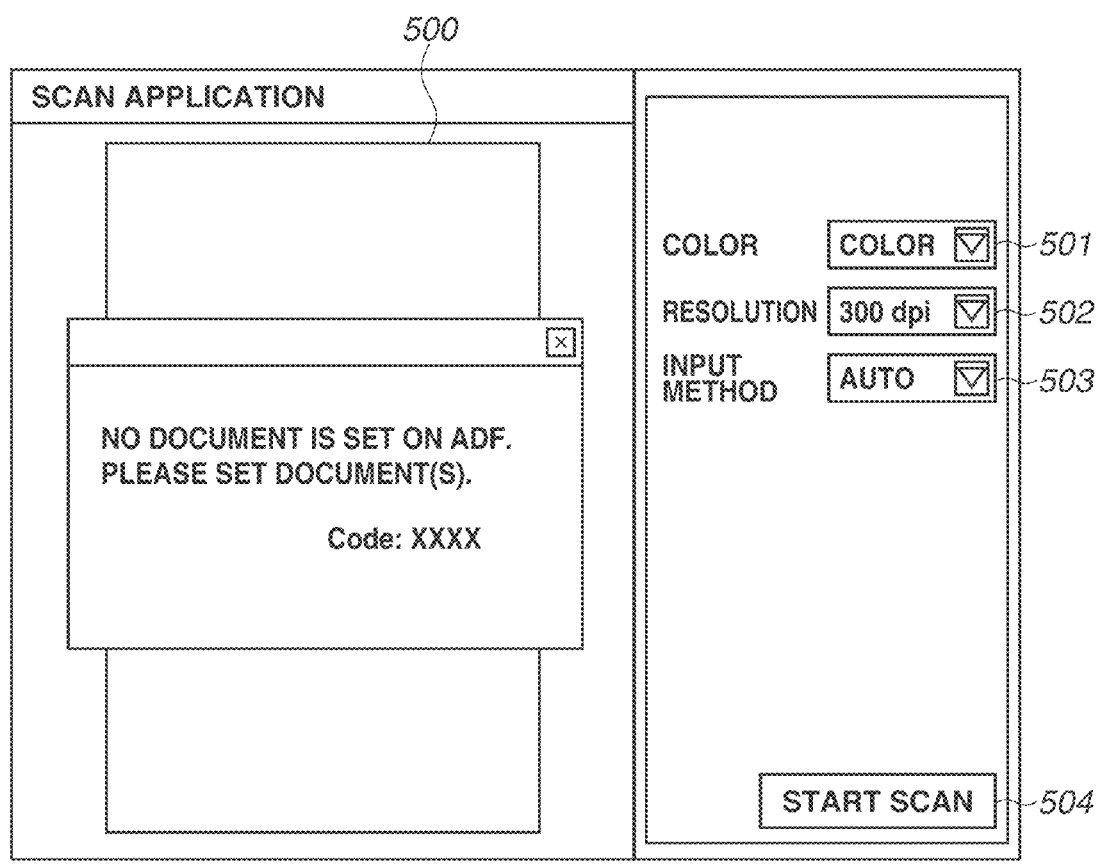
FIG. 13 is a diagram illustrating an error screen of the scan application.

If the CPU 71 determines that no document is placed on the ADF 42 (NO in step S1012), then in step S1013, the CPU 71 displays an error screen 105 on the display unit 90 as illustrated in FIG. 13.

If the CPU 71 determines that a document is placed on the ADF 42 (YES in step S1012), then in step S1014, the CPU 71 transmits a read request (ADF 42) so that an image of the document placed on the ADF 42 is read. In step S1015, the CPU 71 determines whether an acceptance request is received from the MFP 1. If the CPU 71 determines that an acceptance request is received (YES in step S1015), then in step S1016, the CPU 71 transmits an acquisition request for image data (hereinafter, referred to as an image data request) to obtain image data read by the scanner unit 40. In step S1017, the CPU 71 obtains the image data from the MFP 1 as a response to the image data request.

If the pressing plate is selected as the input method (PRESSING PLATE in step S1004), then in step S1018, the CPU 71 transmits a state acquisition request. The processing then proceeds to the foregoing steps S1007 to S1010.

<Description of Operation of MFP 1>

FIG. 14 is a flowchart illustrating an operation of the MFP 1 when recovering from the power saving state.

When the MFP 1 is in the power saving state, the CPU 11 is in a power saving state. In step S1401, if input of an interrupt into an interrupt port of the CPU 11 in the power saving state is detected (YES in step S1401), the CPU 11 recovers from the power conserving state. In step S1402, the CPU 11 having recovered from the power conserving state determines whether the factor responsible for the interrupt is a state acquisition request transmitted from the information processing apparatus 2. If the factor responsible for the interrupt is determined to be the state acquisition request (YES in step S1402), then in step S1403, the CPU 11 determines whether the state acquisition request is in accordance with a pullscan protocol.

If the state acquisition request does not necessarily involve a read operation of the scanner unit 40, the exact state of the scanner unit 40 does not need to be obtained. For example, in the case of a remote access function by which the MFP 1 can be accessed from a web browser of the information processing apparatus 2 to check the state of the MFP 1, the exact state of the scanner unit does not need to be displayed. In the present embodiment, the MFP 1 therefore does not recover from the power saving state if the state acquisition request is not in accordance with the pullscan protocol. This can prevent an increase in the power consumption due to the recovery from the power saving state. In addition, a driving noise originating out of the device(s) supplied with power can also be prevented.

If the received state acquisition request is in accordance with the pullscan protocol (YES in step S1403), then in step S1404, the CPU 11 makes the sensor unit 60 recover to obtain the exact state of the scanner unit 40. Specifically, the CPU 11 performs control such that power is supplied to the sensor unit I/F 61 and the sensor unit 60. In step S1405, the CPU 11 obtains the state of the scanner unit 14 from the sensor unit 60, and updates the state of the sensor unit 40. In step S1406, the CPU 11 transmits the information indicating the updated state of the scanner unit 40, and then performs power saving processing to enter the power saving state.

Subsequently, if, when the MFP 1 is in the power saving state, input of the interrupt into the interrupt port of the CPU 11 is detected (YES in step S1407), the CPU 11 recovers from the power saving state. In step S1408, the CPU 11 having recovered from the power saving state determines whether the factor responsible for the interrupt is a read request transmitted from the information processing apparatus 2. If the factor responsible for the interrupt is determined to be the read request (YES in step S1408), then in step S1409, the CPU 11 makes the MFP 1 recover to the standby state. Specifically, the CPU 11 performs control such that power is supplied to the sensor unit 60 and the scanner unit 40.

In step S1410, the CPU 11 makes the scanner unit 40 start reading a document. In step S1411, the CPU 11 transmits image data of an image read by the scanner unit 40 to the information processing apparatus 2.

In step S1403, the CPU 11 determines whether the received state acquisition request is in accordance with the pullscan protocol. If the state acquisition request is determined to not be in accordance with the pullscan protocol (NO in step S1403), the CPU 11 does not make the sensor unit 60 recover. In addition, the information indicating the state of the scanner unit 40 is not updated. In step S1412, the CPU 11 transmits the not-updated information indicating a temporary state of the scanner unit 40 to the transmission source of the state acquisition request.

In step S1402, if the CPU 11 determines that the factor responsible for the interrupt is not the state acquisition request transmitted from the information processing apparatus 2 (NO in step S1402), then in step S1413, the CPU 11 makes the MFP 1 recover from the power saving state. If the operation unit 20 is operated by the user, if the facsimile unit 50 receives a facsimile, or if the NIC 15 receives data from the LAN, then in step S1413, the MFP 1 recovers from the power saving state and enters the standby state.

An image reading apparatus according to an embodiment of the present invention recovers from the power saving state according to the state acquisition request transmitted before the read request is transmitted. As a result, the image reading apparatus can respond to the state acquisition request with the state of a document to be read.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. It will of course be understood that this invention has been described above by way of example only, and that modifications of detail can be made within the scope of this invention.

This application claims the benefit of Japanese Patent Application No. 2015-088854, filed Apr. 24, 2015, which is hereby incorporated by reference herein in its entirety.

What is claimed is:

1. An image reading apparatus including a reader which reads an image of a document according to a read request transmitted from an external device, the image reading apparatus comprising:
   a sensor which detects a document to be read by the reader;
   a network interface which receives a state acquisition request from the external device; and
   a controller which, on the basis that the network interface receives the state acquisition request when the image reading apparatus is in a power saving state where power supply to the reader and the sensor is stopped, performs control so that power is supplied to the sensor,
   wherein the network interface transmits a state of the document detected by the sensor to which the power has been supplied, to the external device as a response to the state acquisition request.

2. The image reading apparatus according to claim 1, wherein the read request and the state acquisition request are transmitted from a scan driver executed in the external device.

3. The image reading apparatus according to claim 1, wherein the network interface further transmits an execution state of the reader and information indicating that there is an error occurring in the reader as the response to the state acquisition request, in addition to the state of the document.

4. The image reading apparatus according to claim 1, wherein the controller, on the basis that the network interface receives the state acquisition request when the image reading apparatus is in the power saving state, performs control so that power is supplied to the sensor in a state that power supply to the reader is stopped.

5. The image reading apparatus according to claim 1, wherein the state acquisition request is a request transmitted according to a predetermined protocol.

6. The image reading apparatus according to claim 5, wherein the controller, if the state acquisition request transmitted according to the predetermined protocol is received, performs control so that power is supplied to the sensor, and wherein, if a state acquisition request not according to the predetermined protocol is received, power is not supplied to the sensor.

7. The image reading apparatus according to claim 6, wherein the network interface, if the state acquisition request not according to the predetermined protocol is received, transmits previously-stored information indicating the state of the document without updating the previously-stored information indicating the state of the document.

8. The image reading apparatus according to claim 1, wherein the controller performs control so that power is supplied to the reader based on the reception of the read request made by the network interface.

9. The image reading apparatus according to claim 1, wherein the read request includes a first read request that the reader reads a document placed on an automatic document conveyance apparatus, or a second read request that the reader reads an image of a document placed on a transparent plate, and
   wherein the reader, if the first read request is received, reads a document placed on the automatic document conveyance apparatus, and if the second read request is received, reads a document placed on the transparent plate.

10. The image reading apparatus according to claim 1, wherein the network interface updates information indicating the state of the document detected by the sensor and transmits the updated information to the external device based on the reception of the state acquisition request.

11. The image reading apparatus according to claim 1, wherein the state acquisition request is transmitted before the read request is transmitted.

12. The image reading apparatus according to claim 1, further comprising a printer that forms an image on a sheet.

13. The image reading apparatus according to claim 1, wherein the reader includes a reading part which reads an image of a document and a conveyance part which conveys a placed document to the reading part.

14. A method for controlling an image reading apparatus including a reader which reads an image of a document and a sensor which detects the document to be read by the reader according to a read request transmitted from an external device, the method comprising:
   receiving a state acquisition request from the external device when the image reading apparatus is in a power saving state where power supply to the reader and the sensor is stopped;
   supplying power to the sensor based on the reception of the state acquisition request; and
   transmitting the state of the document to be read by the reader detected by the sensor, to the external device as a response to the state acquisition request.

15. A non-transitory computer-readable storage medium storing a program which, when run on a device, causes the device to execute a method according to claim 14.

\* \* \* \* \*